Patented June 20, 1933

1,914,433

UNITED STATES PATENT OFFICE

GEORG KRÄNZLEIN AND FRITZ ROEMER, OF FRANKFORT-ON-THE-MAIN-HOCHST, AND ERICH KRONHOLZ, OF BAD SODEN ON THE TAUNUS, GERMANY, ASSIGNORS TO GENERAL ANILINE WORKS, INC., OF NEW YORK, N. Y., A CORPORATION OF DELAWARE

4-CHLORO-1-AMINOANTHRAQUINONE-2-SULPHONIC ACID AND PROCESS OF PREPARING THE SAME

No Drawing. Application filed December 3, 1928, Serial No. 323,563, and in Germany December 8, 1927.

The present invention relates to 4-chloro-1-aminoanthraquinone-2-sulphonic acid and to a process of preparing the same.

We have found that the hitherto unknown 4-chloro-1-aminoanthraquinone-2 - sulphonic acid can be prepared in a technically easy manner by treating 1-aminoanthraquinone-2-sulphonic acid in an aqueous solution or suspension with chlorine or with an agent capable of splitting off chlorine, while intensely cooling. The result of this reaction was surprising because it is known that free chlorine strongly affects the amino groups of the anthraquinone, so that the amino groups may even be completely eliminated.

The following examples serves to illustrate the invention, but it is not intended to limit it thereto; the parts are by weight:

To a solution of 82 parts of 1-amino-2-anthraquinone-sulphonic acid in 1100 parts of water there are added 10 per cent of sodium chloride. A fine suspension of the sodium salt of the 1-amino-anthraquinone-2-sulphonic acid is obtained, into which chlorine is introduced while intensely cooling, until the sodium salt of the amino acid has been transformed into that of the chloramino acid. The process can very well be observed in a microscopic way, as the starting material and the final product show different crystalline forms. The lances of the sodium salt of 1-aminoanthraquinone-2-sulphonic acid are transformed into the much more finely dispersed small crystals of the sodium salt of the chloraminosulphonic acid.

We claim:

1. The process which comprises treating a compound of the formula

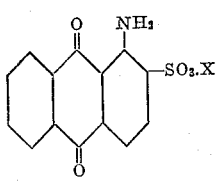

wherein X stands for hydrogen or an alkali metal with a chlorinating agent at a low temperature and in the presence of water.

2. The process which comprises treating a compound of the formula

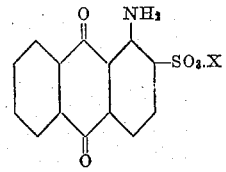

wherein X stands for hydrogen or an alkali metal with a chlorinating agent at a low temperature, in the presence of water and of an inorganic alkali metal salt.

3. The process which comprises treating a compound of the formula

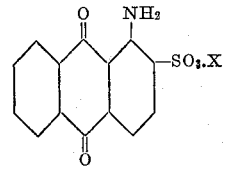

wherein X stands for hydrogen or an alkali metal with chlorine in the presence of water while intensely cooling.

4. The process which comprises treating a compound of the formula

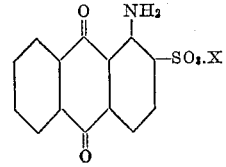

wherein X stands for hydrogen or an alkali metal with chlorine in the presence of water and of an inorganic alkali metal salt, while intensely cooling.

5. The process which comprises treating an alkali metal salt of 1-aminoanthraquinone-2-sulphonic acid with a chlorinating agent at a low temperature and in the presence of water.

6. The process which comprises treating an alkali metal salt of 1-aminoanthraquinone-2-sulphonic acid with a chlorinating agent at a low temperature, in the presence of water and an inorganic alkali metal salt.

7. The process which comprises treating an alkali metal salt of 1-aminoanthraquinone- 2-sulphonic acid with chlorine in the presence of water while intensely cooling.

8. The process which comprises treating an alkali metal salt of 1-aminoanthraquinone-2-sulphonic acid with chlorine in the presence of water and of an inorganic alkali metal salt while intensely cooling.

9. The process which comprises introducing chlorine into a suspension of the sodium salt of 1-aminoanthraquinone-2-sulphonic acid in water while intensely cooling.

10. The process which comprises introducing chlorine into a suspension of the sodium salt of 1-aminoanthraquinone-2-sulphonic acid in water in the presence of sodium chloride while intensely cooling.

11. As a new product, 4-chloro-1-aminoanthraquinone-2-sulphonic acid.

In testimony whereof, we affix our signatures.

GEORG KRÄNZLEIN.
FRITZ ROEMER.
ERICH KRONHOLZ.